June 18, 1957  R. B. JOHNSON  2,796,127
RECORD CARD PUNCHING MACHINE
Filed Nov. 6, 1953  8 Sheets-Sheet 1

INVENTOR.
REYNOLD B. JOHNSON
BY
ATTORNEY

INVENTOR.
REYNOLD B. JOHNSON
BY Robt D. Bear
ATTORNEY

June 18, 1957  R. B. JOHNSON  2,796,127
RECORD CARD PUNCHING MACHINE
Filed Nov. 6, 1953  8 Sheets-Sheet 4

INVENTOR.
REYNOLD B. JOHNSON
BY
ATTORNEY

June 18, 1957 — R. B. JOHNSON — 2,796,127
RECORD CARD PUNCHING MACHINE
Filed Nov. 6, 1953 — 8 Sheets-Sheet 5

INVENTOR.
REYNOLD B. JOHNSON
ATTORNEY

June 18, 1957 R. B. JOHNSON 2,796,127
RECORD CARD PUNCHING MACHINE
Filed Nov. 6, 1953 8 Sheets-Sheet 8

INVENTOR.
REYNOLD B. JOHNSON
BY
ATTORNEY

UNITED STATES PATENT OFFICE

2,796,127

RECORD CARD PUNCHING MACHINE

Reynold B. Johnson, Palo Alto, Calif., assignor to International Business Machines Corporation, New York, N. Y., a corporation of New York Application November 6, 1953, Serial No. 390,552

7 Claims. (Cl. 164—112)

The present invention relates to record card perforating machines. More particularly, it is concerned with machines in which cards provided with perforating positions are selectively punched in those positions under the control of punched card information reproduced from other cards and/or under the control of manually operated keys.

The principal object of the invention is to provide a new manual card punch of increased speed of operation and having an improved simple and inexpensive design for transcribing or reproducing punched card records and also simultaneously providing for entering supplemental punched card data under key control.

In carrying out the broad object of the invention, the machine is provided with one or more card sensing slots. Record cards having prepunched data that is to be reproduced on another card are manually inserted in these slots. Apart from these sensing slots, there is provided a piercing or punching station into which goes the record card to be punched. Supplemental data is selectively introduced into fields of the card being punched that are otherwise not used to receive data from the cards being sensed. Furthermore, visual indicators show the selected supplemental alphabetic or numeric information introduced from the keyboard as each key is struck. Punching or piercing of all the information introduced under keyboard control, as well as that sensed from the record cards in the sensing slot, is effected simultaneously in the selected perforating positions by rotating the drive shaft. The machine cycle is completed when the sensing, piercing, and indicating elements are returned to their home position.

Another object of this invention is to provide a more simple mechanical arrangement for transferring sensed punched card data directly to condition the cooperating punching elements for reproducing the same data in another card to be punched.

Another object of this invention is to provide a simplified escapement mechanism and indicator for simultaneously positioning piercing elements selected under keyboard control and positioning corresponding visual indicating devices.

Still another object of this invention is to provide a novel means for maintaining locked in the selected positions the piercing and indicating elements until the punching operation has been effected.

Still another object of this invention is to provide a novel card-shifting mechanism to enable the sensing of prepunched data that is slightly off registration (that is, where the holes in the prepunched record are slightly above the given card punching positions).

Other objects of the invention will be pointed out in the following description and claims and illustrated in the accompanying drawings, which disclose, by way of examples, the principle of the invention and the best mode, which has been contemplated, of applying that principle.

Among the applications to which the machine of this invention may be applied is a simplified circulation records control in libraries. By way of example, the machine will be described as it is applied to such a typical use.

Figure 2:
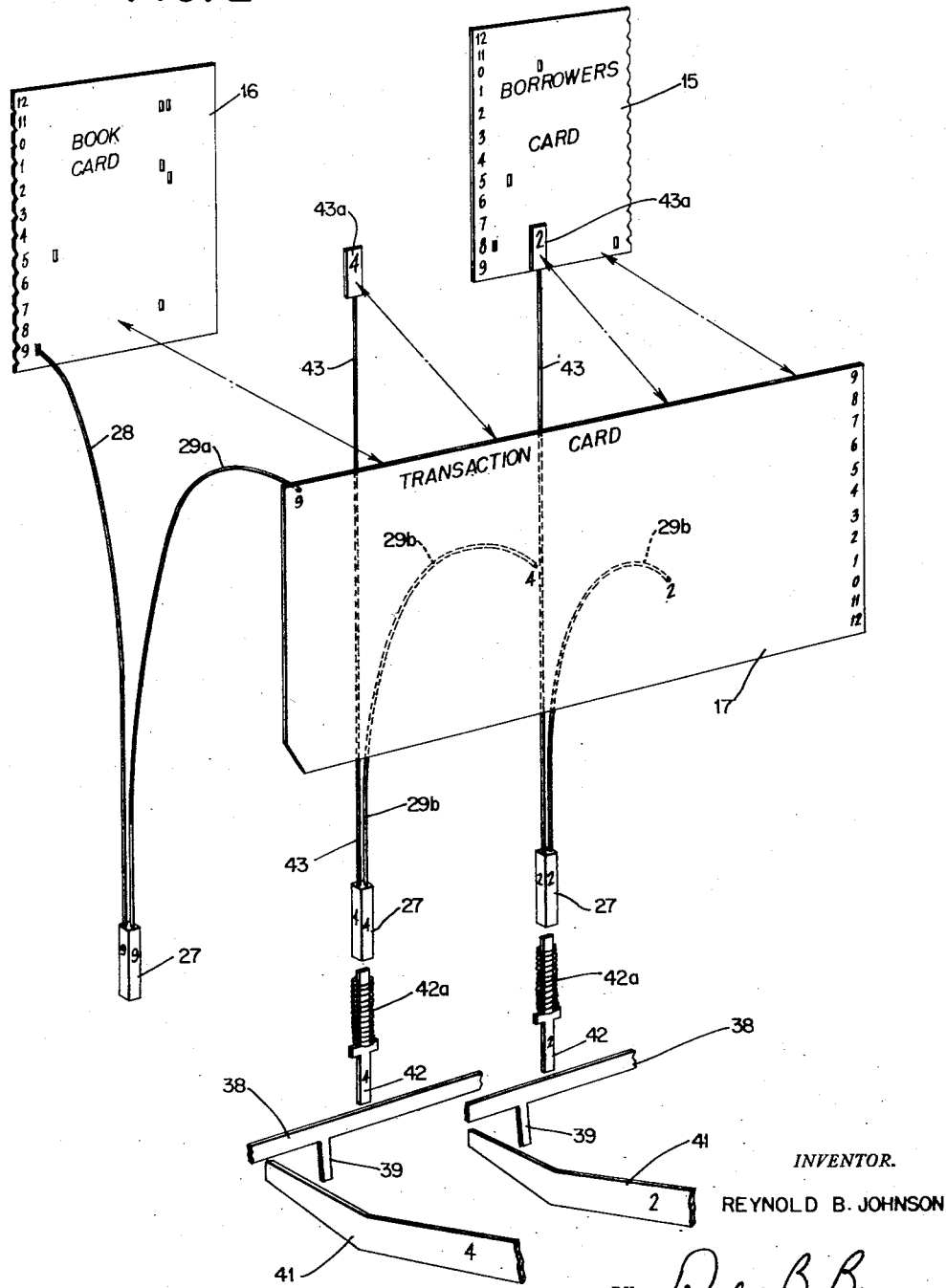
Fig. 2 is a diagrammatic showing of the sensing, keyboard selecting, indicating, and punching mechanism.

Three prepunched records cards are normally involved in the transaction of lending a book under this system (Fig. 2). One card, the so-called borrower's card 15, has prepunched in it the borrower's identifying data. The second card, normally kept in the pocket of the book, has prepunched data relative to the book being lent. This is designated the book card 16. Each of the two foregoing cards are usually stubs or of smaller dimension than the third card, the transaction card 17. The transaction card 17 is entered into the circulation files of the library each time a book is borrowed. The information prepunched in the borrower's card 15 and the book card 16 must be transcribed or reproduced in the transaction card 17. Supplementary information of a variable nature may also have to be entered into the transaction card 17 manually under keyboard control, as for example, the date of the transaction, fines or charges, accession number, and other data not invariably applied to each transaction. Such variable information is punched into the record card in certain fields other than those fields of the transaction card 17 set aside to receive the prepunched information in the borrower's card 15 and the book card 16.

Figure 1:
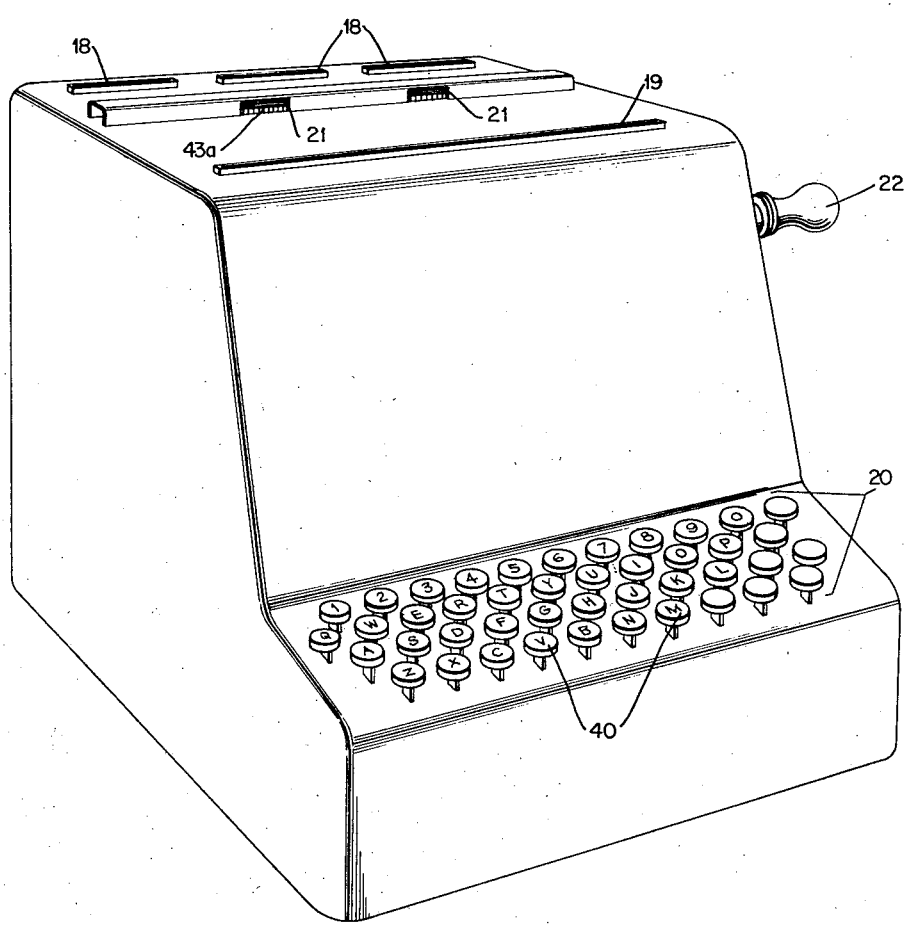
Fig. 1 is an overall perspective of one type of the machine.

When a book it lent, the borrower presents the clerk at the machine (see Fig. 1) with the borrower's card 15 to identify himself and the book card 16 to identify the book he is borrowing. These prepunched cards are manually inserted in the proper sensing slots 18, and the blank transaction card 17 is manually inserted in the punching station slot 19 of the machine. The clerk enters manually on a standard numerical and alphabetic keyboard 20 any of the variable data required for the particular transaction. As he selectively punches the keys, visual indicators generally designated 21 show the information he has introduced in each column of the field of the card designated to be punched with this information. He then pulls the operating crank 22 on the side of the machine, rotating the drive shaft of the machine, and the data from the borrower and book cards are sensed, and then simultaneously that data together with the keyboard selected information are punched into the transaction card 17 in a single operation. The borrower's card 15 is returned to the borrower, the book card 16 is returned to the envelope of the book, and the transaction card 17 is retained in the files of the library as a record of the transaction and as source data for circulation studies that may be desired.

Sensing prepunched information

The data stored in the prepunched cards is mechanically sensed, and simultaneously with the sensing operation, that data is transferred directly to position corresponding piercing or punching wires to set them up for reeproduction of the same data in the transaction card later in the machine cycle (see Figs. 2 and 3).

One or more prepunched cards, such as the borrower's card 15 and the book card 16, are inserted in the slots between the pressure plate 23 and the sensing wire guide plate 24. Spring clips 23b bias the card firmly at each end of the card and lodge the card against pressure plate 23. The slot or slots 18 in which these prepunched cards are inserted determines the field in the transaction card 17 in which the data from the prepunched cards 15 and 16 will be reproduced. The transaction card 17 is placed in the slot between the card support blades 25 and the piercing plates 26. Eighty columns of slugs 27 are provided, there being twelve slugs 27 in each column. There are two wires attached to each of the slugs 27 in the fields used for producing prepunched data, so that corresponding to each slug 27 in these fields a sensing wire 28 is provided for each of the card perforating positions in the wire guide plate 24, and a cooperating punching wire 29a is provided for each of the card punching positions in the card piercing wire aligning plate 25b. The wires 28 and 29a extend from each slug 27 through guide passages in members 24b and 25c, respectively, so that the wires are permitted to move only in a longitudinal direction. At the completion of the machine cycle, the sensing wires 28 and their corresponding piercing wires 29a related to the prepunched data cards 15 and 16 are extended as shown at the extreme left in Fig. 2. At the same time the piercing wires 29b operated manually from the keyboard 20 are in a retracted position (Fig. 2). These latter wires 29b will be explained later.

The pressure plate 23 is mounted on a pair of bell cranks 30 which are pivotable about the shaft 31. The shaft 31 is supported between the main side frames of the machine. Pivoting motion is imparted to the bell cranks 30 by two identical drive cams 32 mounted on the main drive shaft 33 and acting against drive cam rollers 34 mounted on studs to the bell cranks 30 (see Figs. 3 and 5).

When the prepunched data cards 15 and 16 are to be sensed, the drive cams 32 and cam rollers 34 pivot the bell cranks 30 and the pressure plate 23 clockwise, thereby pressing the prepunched record cards against the extended ends of the sensing wires 28. If there is a hole present in a given card punching position, the sensing wire 28 passes through such a hole and extends slightly beyond (for example, .010″) the rear surface of the card into the corresponding channel 36. The drive cams 32 then pivot the bell cranks 30 counterclockwise a slight amount to withdraw the card, let us say, .005 inch away from he furthest clockwise position that the plates have thus far been brought. In this way the sensing wires 28 that have already passed through punched holes remain extended through those holes to a slight degree. The card shifting mechanism then comes into operation to enable the sensing of holes that are slightly off registration. At this time (see Fig. 8) the unlatching lug 23B on the card shift cam 23A contacts the latch 23C and this action releases the latch 23C allowing the plate 23 to move downward, let us say, .030 inch biased by the spring 23D. The action just described causes the prepunched cards to move downward .030 inch carrying with them all of the extended sensing wires 28 that have already found holes in the cards. Furthermore, holes in the card which are above the registered card punching position are now aligned to be sensed concurrently with those that were in registration. The drive cams 32 again rock the bell cranks 30 in a clockwise direction and the prepunched cards advance to the end of the clockwise stroke, this time sensing the holes that are in registration, and those that are slightly above registration. A sensing wire 28 in a non-perforated position is contacted by the surface of the card and will yield under the pressure of the card and be pushed through its guide channel 35 to the right and downward. The slugs 27 attached to sensing wires 28 being pressed downward by the card will also be forced downward, thereby retracting the ends of the attached corresponding piercing wires 29a to a position flush with the face of the piercing wire aligning plate 25b. Meanwhile, any sensing wire 28 in a position corresponding to a prepunched hole in the record (whether in perfect registration or not as previously described) will not meet with the resistance of the card but rather will extend into the corresponding channel 36 in the pressure plate 23, as the pressure plate 23 is pivoted clockwise. The slugs 27 and piercing wires 29a related to such extending sensing wires 28 will remain in their restored position. Piercing wires 29a corresponding to a prepunched hole thus sensed will then extend beyond the face of the piercing wire aligning plate 25b in perforating position to reproduce the prepunched data by punching holes in the transaction card 17 during the piercing stroke.

Manual control of selected supplementary data

A standard numerical and alphabetic keyboard may be incorporated for controlling the insertion of supplementary information by manual selection of an operator. Below the interposer carriage assembly 37 (Fig. 7) there are disposed twelve crossbars such as 38 arranged from the rear of the machine to the front to correspond with the twelve columnar positions of the well-known IBM card. The lower edge of these bars is provided with teeth 39 that project from the bars at intervals such that they cooperate with the depressing action of certain keys. Depressing a key 40 attached to key lever arm 41 causes the key lever arm 41 to pivot on the shaft 45. This, in turn, because of the relative positioning of the cooperating teeth 39 on the crossbars 38, lifts the appropriate crossbars 38 to operate against corresponding interposers 42. The interposers 42 are forced upward against the bias of spring 42a contacting the lower end of the slugs 27 forcing the contacted slugs upward, so that the piercing wires 29b (see Fig. 2) attached to such slugs extend beyond the surface of the piercing wire aligning plate 25b. Since the slugs 27 provided for the keyboard control of data have attached piercing wires 29b and also attached the corresponding indicating wire 43 and tab 43a, the same lifting action of the slug 27 also causes the visual indicator tabs 43a to extend above the cover of the machine. Hence, the operator can verify by eye the information entered manually before the actual perforating operation is begun.

For example, when a numeric key is depressed, the corresponding crossbar 38, let us say the "4" crossbar, will be raised. This in turn, through the action just described, lifts the proper interposer 42, forcing upward the fourth slug 27 in the column at which the interposer carriage 37 is then stationed, thereby forcing the "4" piercing wire 29b upward and to the right, so that it extends beyond the piercing wire aligning plate 25b; at the same time the slug 27 forces the "4" indicator tab 43a to extend above the cover of the machine to show that a "4" has been entered. When an alphabetic character key, such as "C," is depressed, both the "12" zone crossbar 38 and the "3" numeric crossbar 38 will be raised similarly to enter perforations that represent "C" according to the well-known punched card code.

The crossbars 38 are supported between bell cranks 44 at each end. The bell cranks 44 are pivotable about the key arm shaft 45. The shaft 45 is supported from the side plates of the main frame. In order to maintain parallel motion throughout the length of the crossbars 38, despite the variable location at which force is applied to the crossbars by the projections 39 on the key bars 38, crossover shafts 46 through links 47 attached thereto, pivotable on the bell cranks 44 at one end and attached to the cross-over bars 46 at the other end, are provided for support and guidance. The cross-over shaft 46 is supported by slots in the sides of the main frame of the machine.

Above the crossbars 38 is disposed an interposer carriage assembly 37 which, under the control of a modified dog and escapement mechanism, is free to travel the entire width of the machine. The parallel travel of the carriage 37 is controlled by racks 48 and pinions 49. Twelve interposers 42 in a column, corresponding to the twelve punching positions in each column of a conventional punched card, are guided by slots in the upper and lower carriage guide plates 50. Compression springs such as 42a acting between the upper guide plate and the ears of the interposers 42 urge the interposers against the lower guide plate 50. Disposed above the path of the carriage are eighty laminated wafers, each containing a column of twelve slugs such as 27. Thus in the key-control operation, lifting of a crossbar 38 upon depression of a key 40 operates the appropriate slug 27 through the interposer 42 in registry with that slug only in the column at which the interposer carriage 37 is located.

*Carriage control and movement*

Figure 4:
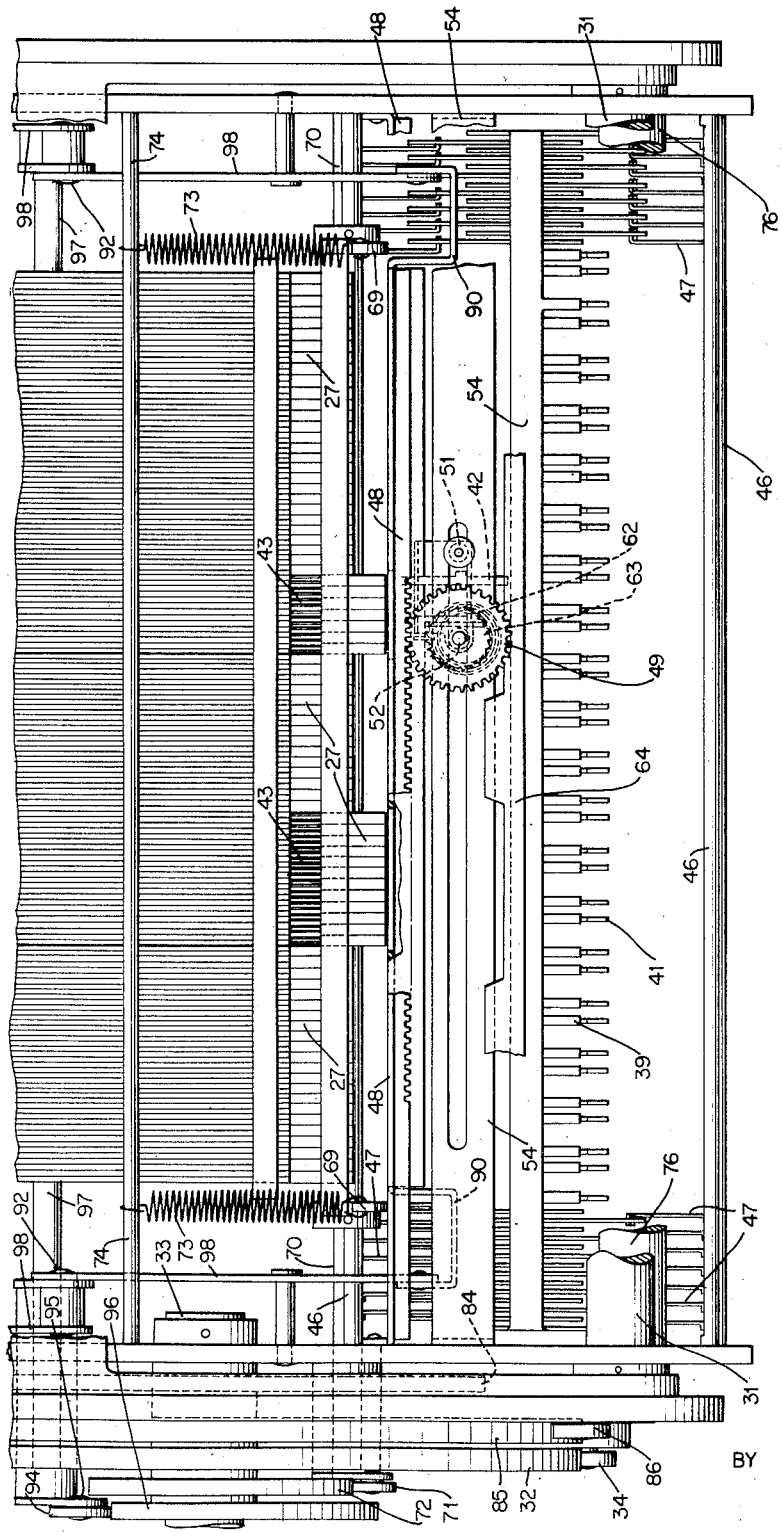
Fig. 4 is a section through the length of the machine and is a diagrammatic showing the relationship of the escapement mechanism to the rest of the machine.
Figure 6:
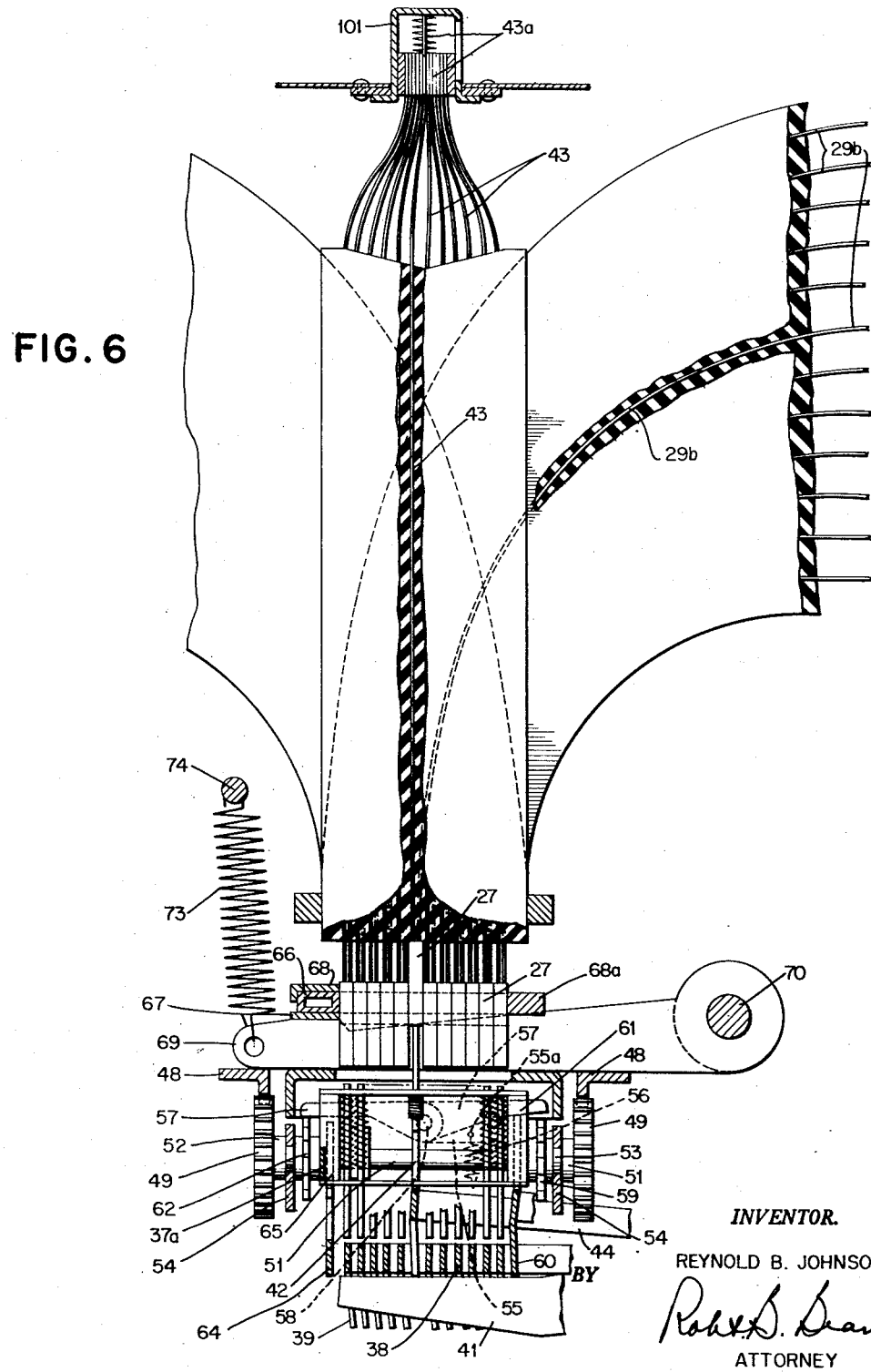
Fig. 6 is a partially diagrammatic and partially cut away side section through the indicating device and escapement mechanism.
Figure 7:
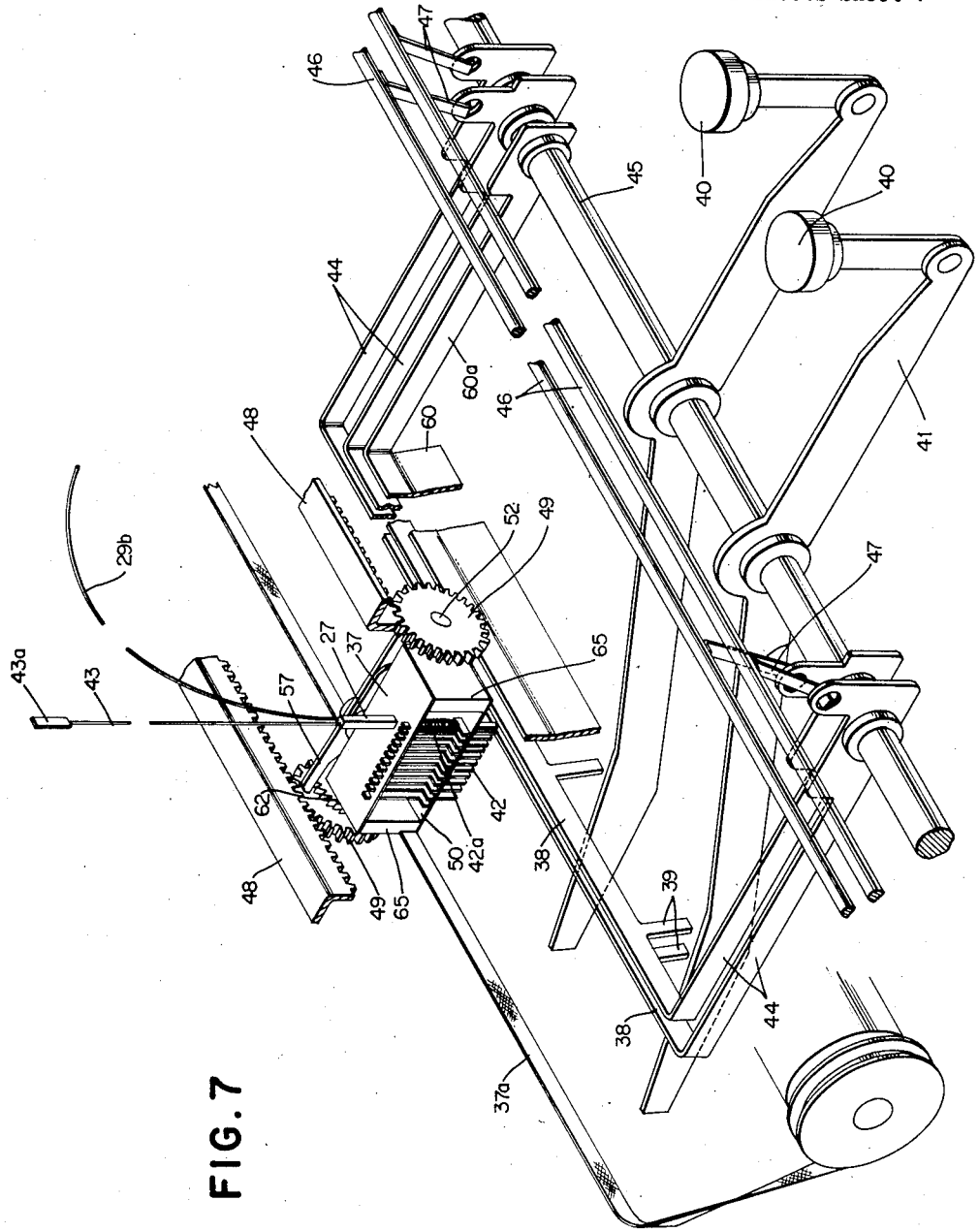
Fig. 7 is a diagrammatic showing of the keyboard selecting device, the escapement mechanism, and the indicating and punching device.

The interposer carriage assembly 37, as shown in Fig. 6, is supported by two shafts 51 and 52 extending through its side frames supported by slots 43 in the side guides 54. On the ends of the support shafts 51 and 52 are fixed pinion gears 49 which mesh with the racks 48 (Figs. 6, 7, and 7a). The racks 48 and the side guides 54 in turn are supported from the main frame. A link 55 is pivoted on a stud 55a fixed to the rear plate of the interposer housing and is biased by a spring 56 in a clockwise direction, as viewed in Fig. 6, against a stop stud. A pawl 57 is fixed to the free end of the link 55 and is centrally pivotable about a stud 58. The pawl 57 is spring biased to maintain firm engagement with the ratchet wheel 59. A bail or space bar 60 extends the width of the machine and is supported at each end by arms 60a which are pivotable about the shaft 45 (see Fig. 7). Thus, the depression of a space key or an alphabetic or numeric key 40 will cause the corresponding coacting arm 41 to pivot against and raise the space bar 60. The space bar 60 in turn urges up the interposer pin 61 which is guided in the interposer carriage housing plate. The interposer pin 61, on rising, pivots the pawl 57 about the stud 58, thereby disengaging the right end of the pawl 57 from the ratchet wheel 59 and positioning the left-hand end of the pawl 57, so that it will engage the next succeeding tooth of the ratchet wheel 62 as it advances. The ratchet wheels 59 and 62 are cooperatively mounted on the shafts 51 and 52, respectively, so that the teeth of the left ratchet wheel 62 are slightly advanced relative to the rotative position of the teeth on the right wheel 59. A helical spring 63 concentric to and fixed to the shaft 51 and the carriage frame urges the shaft 51 to rotate in a clockwise direction, as viewed in Fig. 4. Hence, in Fig. 6, as the pawl 57 is pivoted as previously described, the carriage will advance approximately one-half columnar position until the next tooth of the ratchet wheel 62 is engaged by the pawl 57. When the space bar 60 is lowered as a result of releasing the key 40, interposer pin 61 drops and the spring 56 pivots the pawl 57 to its normal position, thereby disengaging the pawl 57 from the ratchet wheel 62 and positioning the pawl 57 to engage the next succeeding tooth of the right-hand ratchet wheel 59 as it advances under the influence of the helical spring 63. This action completes the movement of the carriage 31 one columnar punching position to the right.

Since there are frequently fields in the card where information need never be entered manually, provision has been made to advance the carriage 37 past these fields automatically. A skip bar 64 having high dwells and low dwells proportioned and positioned along its length according to the particular fields desired to be automatically passed by the carriage is fixed to the frame of the machine, as shown in Figs. 6 and 7. An interposer pin 65 guided in the carriage housing is forced upward by the high dwell of the skip bar 64 to hold the left end of the pawl 57 out of engagement with the ratchet wheel 62. Depression of the space key while the interposer pin 65 is riding on a high dwell of the skip bar 64 will pivot the pawl 57 out of engagement with the right-hand ratchet wheel 59 as in normal spacing operation, but the interposer pin 65 prevents engagement by the pawl 57 of the left-hand ratchet wheel 62, and the carriage 37 will advance under the influence of spring 63 until the carriage reaches a low dwell of the skip bar 64. At this point the interposer pin 65 drops and allows the left end of the pawl 57 to drop correspondingly into engagement with the ratchet wheel 62 and stop the movement of the carriage 37. The restoration of the pawl 57 back into engagement with ratchet wheel 59 after this operation is the same as for column-by-column spacing.

The carriage 37 is returned at the end of its excursion after all of the key controlled information is entered by a conventional tape return mechanism 37a operated by the main drive shaft 33.

*Locking the piercing wires in position*

The piercing wires 29b selected by manual keyboard control and also the piercing wires 29a selected by prepunched card control are locked in position after the keyboard selecting and the sensing have been completed but before the piercing operation is begun. This is accomplished by firmly securing the slugs 27 in position after the sensing and keyboard selecting operations just described have been completed. Referring to Figs. 3 and 6, an elastic tube 66 filled with liquid extends across the width of the machine and is supported by the bail 67. In its inoperative position the tube 66 is confined on three sides by the supporting bail 67 on the bottom and a fixed bail 68 having an L-shaped cross section that confines the tube 66 on its upper and left sides. The right side of the tube 66 extends along the bank of the slugs 27 without exerting any pressure on the slugs.

When the supporting bail 67 is moved upward, however, as the locking operation begins, the elastic tube 66 filled with substantially non-compressible liquid is free to expand only toward the right and exert pressure on the bank of slugs 27. The slugs 27 are then firmly locked in position as they are confined between the expanding tube 66 on the left and the fixed pressure bar 68a extending along the opposite side of the bank of slugs 27. The mutual friction between the contacting surfaces of the slugs 27 together with the opposing pressure just mentioned is enough to retain the slugs 27 secure in their selected positions during the piercing operation.

Attached to the supporting bail 67 at its ends are operating links 69 which are pivotable about studs 70 that are fixed to the side frames of the machine. While the slugs 27 are being positioned in the sensing and key control selecting operations, cam rollers 71 attached by studs to the links 69 pivot the links 69 counterclockwise under the influence of cams 72 mounted on the drive shaft 33. The rollers 71 are biased against the cams by a spring 73 fixed at one end to the link 69 and at the other end to a stud 74 on the main frame of the machine. When in the machine operating cycle the slugs 27 are all positioned and ready to be locked, the low dwell of cam 72 in combination with spring 73 pivots the links 69 clockwise. The supporting bail 67 then rises and compresses the elastic liquid-filled tube 66, forcing it to expand to the right and exert pressure against the bank of slugs 27. After the piercing operation is completed, the high dwell of cam 72 operates through the linkage described to lower the supporting bail 67 against the bias of spring 73 and releases the compressing force on the tube 66, allowing it to return to its normal cross-sectional shape, and thereby unlocks the slugs 27.

The piercing operation

Figure 5:
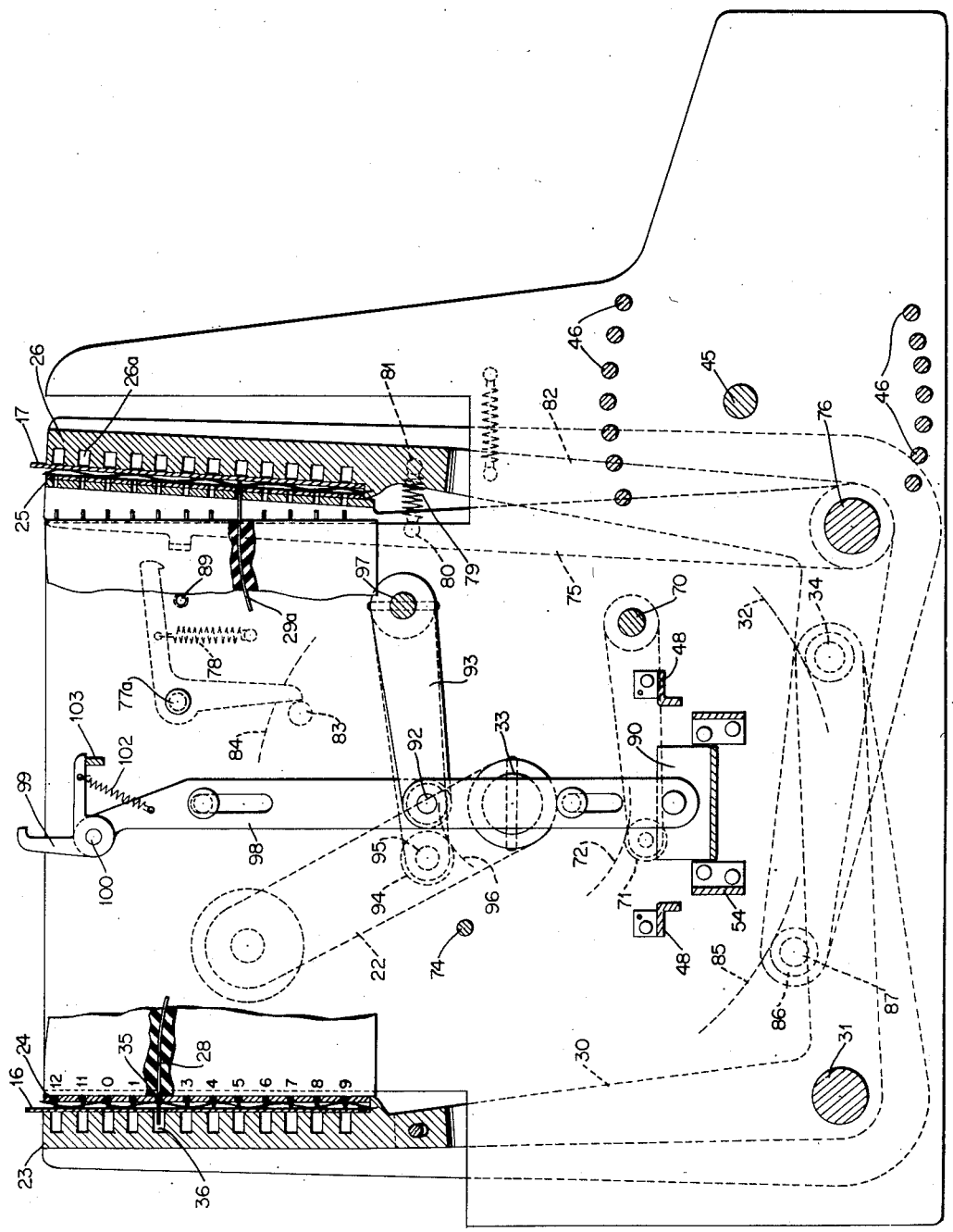
Fig. 5 is a partially diagrammatic and partially cut away side section showing the cam operation and restoring mechanism.

The piercing wire aligning plate 25b is supported laterally by two arms 75 that are pivotable about the shaft 76. At the beginning of the machine cycle the piercing wire aligning plate 25b and its arms 75 are latched, as shown in Fig. 3, by the bell crank hook 77 biased by the spring 78. The spring 79 is anchored on one end on the stud 80 of the piercing plate pivot arms 75 and a stud 81 on the support plate pivot arms 82. After the slugs 27 have been locked in position, a stud 83 on the cam 84 fixed to the main drive shaft 33 strikes the arm of the bell crank hook 77, as shown in Fig. 5. The bell crank hook 77 then pivots counterclockwise on its mounting stud 77a which is fixed to the main frame of the machine. Biased by the spring 79, the arms 75 and the piercing wire aligning plate 25b are pivoted, aligning all the extended piercing wires 29a and 29b at the face of the card 17 to be perforated in the proper piercing position.

The actual piercing operation is then initiated by the positive action of the piercing cams 85 mounted on the drive shaft 33. As the high dwell of the piercing cams 85 reaches the cam rollers 86 fixed to a stud 87 on the support plate pivot arms 82, the pivot arms 82 rotate in a counterclockwise direction about their shaft 76. The support plate 26 carrying the transaction card 17 is thus positively driven against the extended piercing wires 29a and 29b. The card 17 is sandwiched between the plates 25b and 26 under the tension of spring 79. Those piercing wires that are extended perforate holes in the card 17 and extend through the card into the channels such as 26a in the support plate 26.

At the end of the piercing operation, the piercing wire aligning plate 25b and its arms 75 are driven by the counterclockwise movement of the support plate 26 and its arms 82 to pivot counterclockwise about the shaft 76. After the unlatching stud 83 passes out of range of hook 77, the bell crank hook 77 is biased by the spring 78 clockwise, and the hook 77 comes to rest against the stop stud 89. The aligning plate arms 75, as they swing counterclockwise, are latched in the restored position by the hook 77.

Figure 3:
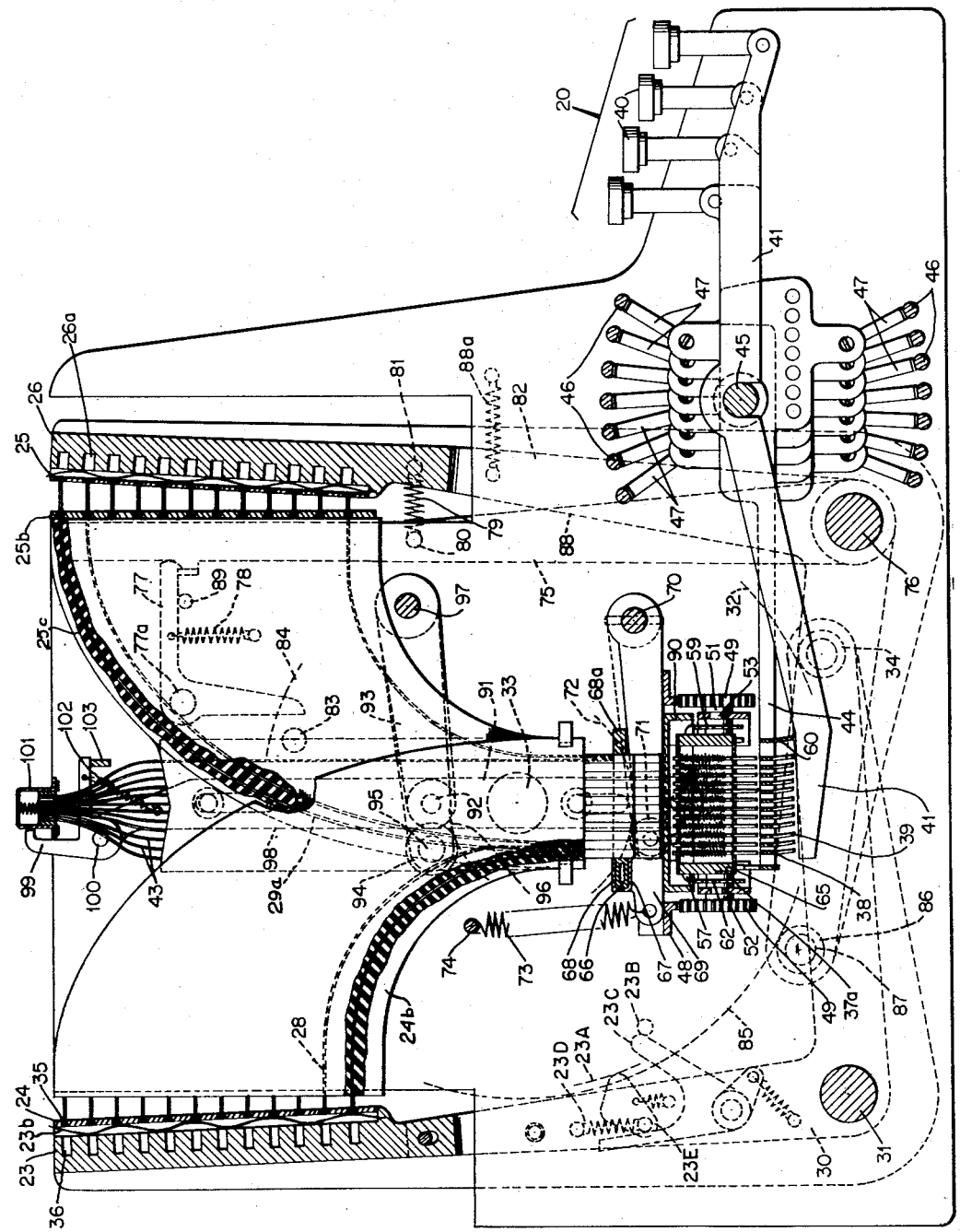
Fig. 3 is a side section of the machine which is partially schematic and partially cut away.

The support plate 26 and its pivotable arms 82 are restored to the position shown in Fig. 3 under the influence of the spring 88a which is effective to rotate the arms 82 clockwise after the rollers 86 have dropped off the high dwell of cam 85.

Restoration of the sensing and piercing wires and their associated operating mechanisms The restoration of the slugs 27 is begun as soon as the sensing plate 23 and the piercing wire aligning plate 25b and the support plate 26 are restored to the position shown in Fig. 3. The inverted U-shaped slug lifting bail 90 (Figs. 3 and 5) extends beneath the eighty columns of slugs 27 and is supported at each end by links 91. The slug lifting bail 90 has holes cut into it corresponding to the slugs that control each field of the card that receives keyboard controlled information, so that it will not operate cooperatively with those slugs. The links 91 of the slug lifting bail 90 are connected by the stud 92 to the restoring links 93. A roller 94 is mounted on the restoring links 93 by a stud 95. Restoring cams 96 mounted on the drive shaft 33 operate cooperatively with the rollers 95 to pivot the restoring links 93 about the fixed studs 97. A high dwell of the restoring cams 96 pivots the restoring links 93 clockwise, thereby raising the slug lifting bail 90 against the bottoms of the slugs 27 and forcing the sensing wires 28 and piercing wires 29a upward until they extend beyond the face of their aligning plates 24 and 25b, respectively.

Also attached to the restoring link 93 at the stud 92 is the indicator restoring link 98. As the restoring link 93 pivots under the restoring cam action in a clockwise direction during the restoring cycle, the indicator depressing link 98 is lifted so that the pivotable bell crank 99 fixed to the link 98 by the stud 100 drops over the top of the indicator tab restoring bail 101. The bell crank 99 is held in this position of engagement over the top of the indicator restoring bail 101 under the tension of the spring 102 which biases the bell crank 99 in a clockwise direction. Next, as the roller 94 is presented with the low dwell of the restoring cam 96, the restoring link 93 pivots counterclockwise, drawing down the link 98, the bell crank 99, and depressing the indicator restoring bail 101 which also lowers all the extended indicator tabs 43a forcing them downward through the guides below the cover of the machine. Since these indicators 43a are fastened by wires 43 to the corresponding slugs 27, all the associated piercing wires 29b for the manually set columns will also be retracted behind the piercing wire aligning plate 25b, and all of these slugs 27 will be restored to the home position. Toward the end of the downward stroke of the indicator restoring link 98 and after the indicators 43a have been forced down to their normal positions, the arm of the bell crank 99 strikes the knock-off stud 103 which causes the bell crank 99 to pivot counterclockwise against spring tension, thereby releasing the indicator restoring bail 101 to return under spring tension to its normal non-interfering position above the indicator tabs 43a. Furthermore, as the restoring link 93 pivots counterclockwise, as described, the slug lifting bail 90 is lowered to its home position as shown in Fig. 3.

The card shifting mechanism operates to restore the plate 23 upward to the original position after the piercing operation is complete. The card shift cam 23A operates the releatch arm 23E to the left of the plate 23. When the plate 23 is raised sufficiently, the spring-loaded latch 23C rotates under the plate 23 and secures it in its upper or home position.

Figure 8:
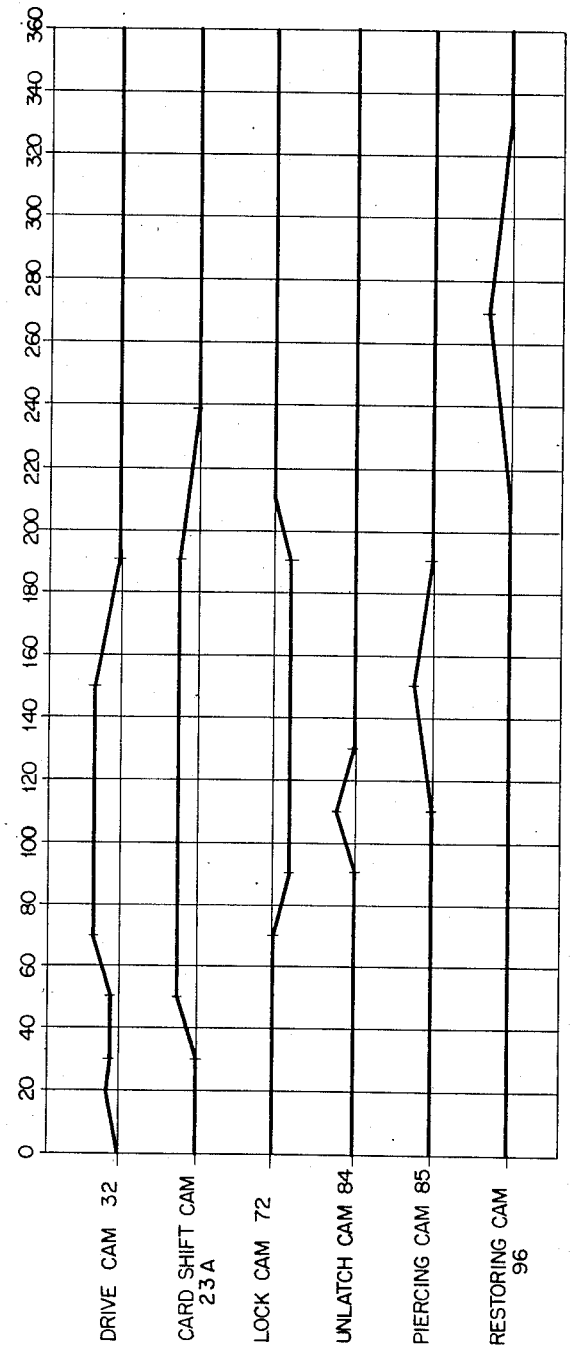
Fig. 8 is a time diagram showing the relative operation of the cams during the machine cycle.

The relative timing shown in Fig. 8 of the operating cams described results in the sequence of operations illustrated by way of example to produce the machine cycle.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a record card machine, means for supporting a prepunched card and a record card in spaced relationship, a plurality of arcuate sensing wires each having one end extending to a hole-punching position on said prepunched card, a plurality of arcuate recording wires each having one end extending to a recording position on said record card, means guiding each of said wires for movement only in a longitudinal direction, means for attaching each of said sensing wires to a corresponding recording wire at the other ends of said wires, and means for moving said prepunched card against said extending ends of said sensing wires so that those wires opposite unpunched hole-punching positions are displaced longitudinally, said arcuate wires guided for longitudinal movement being so formed that said longitudinal displacement of said sensing wires opposite unpunched hole punching positions in said prepunched card is effective to cause a similar longitudinal displacement of corresponding recording wires away from recording positions on said record card.

2. In a record card machine, means for supporting a prepunched card and a record card in parallel spaced relationship, a plurality of flexible sensing wires each having one end extending to a hole-punching position in said prepunched card, a plurality of flexible recording wires each having one end extending to a recording position in said record card, means for attaching each of said sensing wires to a corresponding recording wire at the other ends of said wires, said flexible wires being so formed as to be substantially normal to said cards at the ends extending to the sensing and recording positions, respectively, and substantially parallel to said cards at the connected ends, means guiding said wires for movement only in a longitudinal direction, means for moving said prepunched card toward the extending ends of said sensing wires to engage and displace sensing wires opposite unpunched hole-punching positions, whereby recording wires connected to displaced sensing wires will be moved away from corresponding recording positions on said record card, and means for moving said record card against the ends of recording wires extending to recording positions for effecting a recording of said record card at such positions.

3. In a record card machine, means for supporting a prepunched card and a record card to be punched, said cards being located in spaced vertical planes, a plurailty of slugs each corresponding to a hole-punching position on said cards, said slugs being displaceable vertically in the space between said vertical planes, a flexible sensing wire attached to each slug and extending to a hole-punching position on said prepunched card, a flexible piercing wire attached to each slug and extending to a corresponding hole-punching position on said record card, said wires being so formed as to be horizontal at the ends extending to the hole-punching positions, means guiding said wires for movement only in a longitudinal direction, and means for moving said prepunched card against the ends of sensing wires extending horizontally to unpunched hole-punching positions to vertically displace the attached slugs, whereby the horizontally extending ends of piercing wires attached to the displaced slugs will be moved away from corresponding hole-punching positions on said record card.

4. In a record card machine, means for supporting a prepunched card and a record card, said cards being located in spaced planes, a flexible sensing wire and a flexible piercing wire attached at one end for concurrent conditioning in the space between said planes and extending at their other ends to corresponding hole-punching positions on said prepunched card and record card respectively, passage means for guiding said wires for movement in a longitudinal direction, means for moving said prepunched card to engage the extending end of said sensing wire to effect concurrent shifting of the joined wires if there is no hole at said hole-punching position on said prepunched card, means for subsequently moving said record card into a position for engaging said piercing wire if the latter has not been shifted, and means for holding said wires stationary during said subsequent movement to render the extending end of an unshifted piercing wire effective to pierce the corresponding hole-punching position in said record card.

5. In a record card machine, a sensing station, a punching station, a plurality of conditionable elements each having a sensing end extending to a hole-punching position at said sensing station and a piercing end extending to a hole-punching position at said punching station, means for moving a prepunched card at said sensing station toward the extending sensing ends of said elements to condition said elements according to the data sensed in said prepunched card, means operable after said elements have been conditioned to move said record card at said punching station toward the extending piercing ends of said elements to effect piercing of said record card according to the data sensed in said prepunched card, and means expansible under external pressure to exert force on said elements for securing said elements during said movement of said record card.

6. In a record card machine, a sensing station, a piercing station, a plurality of movable slugs each having an attached sensing wire extending arcuately to a hole-punching position at said sensing station and an attached piercing wire extending arcuately to a hole-punching position at said punching station, means for constraining each of said wires for movement along a fixed arcuate path, means for moving a prepunched card at said sensing station against said sensing wires not opposite holes to move the latter, their slugs and the piercing wires attached thereto to new positions, means for moving said record card against the piercing wires not moved to new positions, and means for frictionally securing said slugs during said movement of the record card to render the attached piercing wires not moved effective to punch said record card with data corresponding to the data sensed in the prepunched card.

7. The invention as claimed in claim 6 wherein said frictional securing means comprise, directionally opposed forces acting upon said slugs at least one of which is provided by a fluid filled flexible tube expansible under external mechanical pressure to exert said force on said slugs.

References Cited in the file of this patent
UNITED STATES PATENTS

| 1,840,515 | Tasker | Jan. 12, 1932 |
| 2,425,490 | Pitman | Aug. 12, 1947 |

FOREIGN PATENTS

| 272,954 | Germany | Apr. 14, 1914 |
| 252,734 | Great Britain | June 9, 1927 |
| 485,139 | Canada | July 22, 1952 |